W. W. GREEN.
LUMBER TRUCK.
APPLICATION FILED APR. 7, 1908.
906,128.
Patented Dec. 8, 1908.
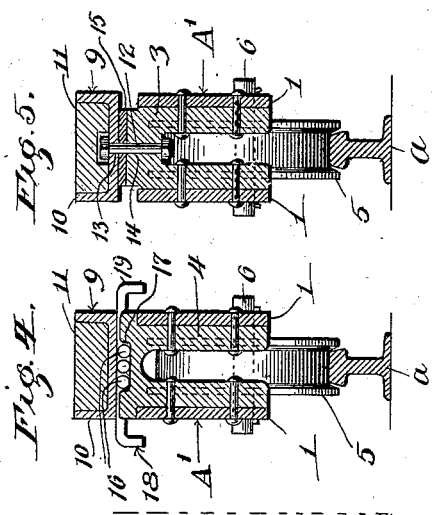
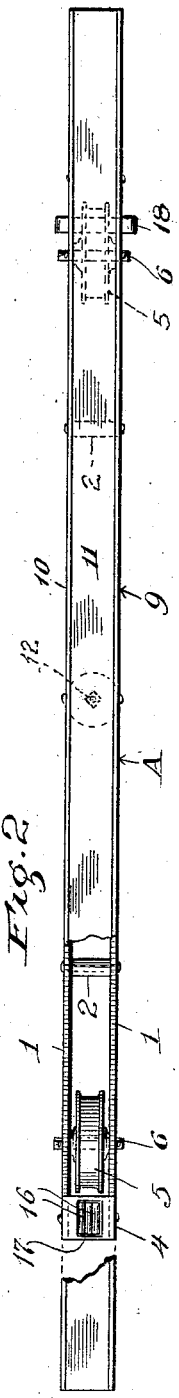
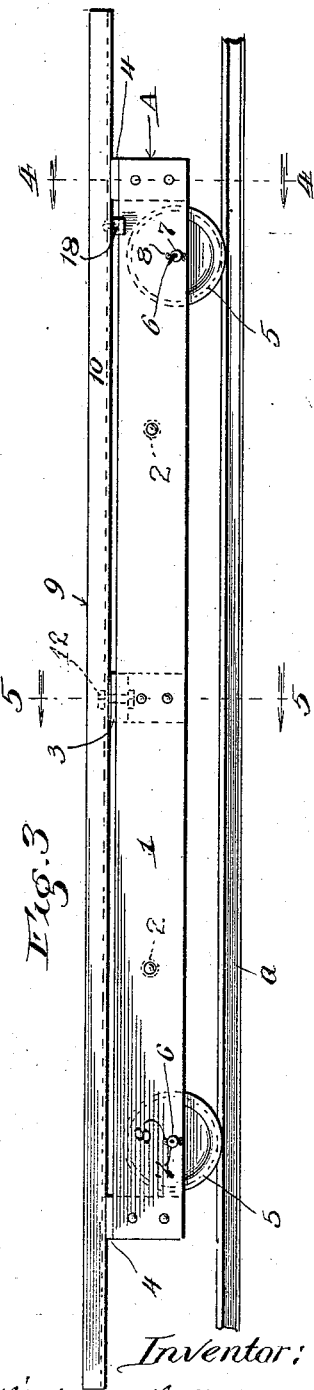
Witnesses:
Frank Bemm
Leon S. Russell
Inventor:
William W. Green,
by Charles O. Sherwey
his Atty.

UNITED STATES PATENT OFFICE.

WILLIAM W. GREEN, OF NILES, MICHIGAN.

LUMBER-TRUCK.

No. 906,128.  Specification of Letters Patent.  Patented Dec. 8, 1908.

Application filed April 7, 1908. Serial No. 425,660.

*To all whom it may concern:*

Be it known that I, WILLIAM W. GREEN, a citizen of the United States, residing at Niles, in the county of Berrien and State of Michigan, have invented a new and useful Improvement in Lumber-Trucks, of which the following is a specification.

This invention relates to improvements in lumber trucks.

The object of this invention is to provide a truck of improved construction whereby certain difficulties now attendant upon trucks of this class may be wholly avoided. These trucks are employed to carry lumber into dry kilns and run upon the ordinary rails which are spaced apart some eight or ten feet. The trucks are arranged in pairs and the lumber is piled across each pair up to a considerable height so that the trucks are required to support and carry an immense weight of lumber. If the trucks of the ordinary kind are not set in perfect alinement with each other or with the track, there is always the danger that the flanges of the truck wheels will be broken off, because of the side pressure against the rails. The weight of the lumber upon the trucks ties the two trucks together so that neither can shift sidewise with respect to the load upon them, so that if either truck is out of alinement with the track the flanges of the wheels will impinge against the sides of the rails causing great friction, making it very difficult to move the load and frequently breaking the flanges off the wheels. I have overcome this difficulty by providing the truck with a saddle, which is laterally movable with respect to the truck so that the truck may adjust itself to the irregularities of the track and into alinement therewith.

The invention is clearly illustrated by the accompanying drawing, of which

Figure 1 is an end view of a pair of trucks containing my improvement with a load supported thereby. Fig. 2 is a plan view of one of the trucks. Fig. 3 is a side view thereof. Fig. 4 is a detail cross section taken on line 4—4, Fig. 3 and Fig. 5 is a detail cross section taken on line 5—5, Fig. 3.

In these views A, A represent a pair of trucks running upon rails *a, a,* and upon which is supported the load C in the usual manner. As seen the body A' of each truck comprises two side plates 1, 1, which are connected by struts 2, 2, and blocks 3 and 4. The struts and blocks are preferably riveted to the side plates by rivets to provide a frame of substantial construction. Two flanged wheels 5, carry the truck frame and are journaled thereupon by means of pins 6, which are secured in apertures 7, formed in the side plates. The pins may be secured against longitudinal movement as by cotter pins 8.

The particular construction thus far described is immaterial to my invention broadly considered, as any well known truck of substantial construction may be employed.

Above the truck body is supported a saddle 9, which is laterally movable with respect to the frame. As shown the saddle comprises a channel iron 10 of suitable length in which may be secured, if desired, a plank or bar 11. In the form shown the saddle is swiveled to the frame at its central point so as to be horizontally oscillatable upon the frame. The swiveled construction is formed by a bolt 12 which passes through apertures 13, 14, in the saddle and center block 3, respectively. If desired a washer 15, may be interposed between the center block and saddle. The distal ends of the saddle may rest directly upon the end blocks 4, or if desired anti-friction rollers 16 may be interposed between the end blocks and saddle. When rollers are employed pockets 17 may be formed in the upper faces of the end blocks for the reception of the rollers, and the rollers should be of such diameter as to project slightly above the upper surface of the end blocks.

Stops 18 may be provided for limiting the movement of the saddle, and one form of stop is shown in the drawing as consisting of a bar 19, having down turned ends, and secured upon the underside of the saddle. The down-turned ends contact with the sides of the frame to limit the lateral movement of the saddle.

In operation two trucks are placed side by side on the track, and the lumber piled upon them. The load practically ties the trucks together so that they are compelled to move together in unison. Now, if either happens to be slightly out of alinement with the rail upon which it runs, the truck body is still free to turn upon the swivel, so as to adjust itself upon the rail and follow any irregularities thereof, thereby avoiding the danger of breaking the wheels. The resistance ordinarily caused by the friction between the wheel flanges and rails is eliminated and the load can therefore be propelled with greater ease.

I am aware that various alterations and modifications of the device are possible without departing from the spirit of my invention, and I do not therefore desire to limit myself to the exact form shown and described except as may be necessary by the prior art.

I claim as new and desire to secure by Letters Patent.

1. A lumber truck comprising a long body supported by two wheels, and provided with a saddle, which is horizontally movable with respect to the body of the truck, anti-friction end bearings and an intermediate bearing for said saddle.

2. A lumber truck comprising a long body supported by two wheels and provided with a laterally shiftable saddle, having a limited amount of movement, a central bearing and end bearings for said saddle.

3. A lumber truck, comprising side plates, flanged wheels journaled upon said side plates, a center block and two end blocks, a saddle resting upon said center block and end blocks and a swivel connection between the saddle and center block.

4. A lumber truck, comprising side plates, flanged wheels journaled upon said side plates, a center block and two end blocks, a saddle resting upon said center block and end blocks, a swivel connection between the saddle and center block, and a stop for said saddle.

5. A lumber truck provided with a saddle which is laterally movable with respect to the body of the truck and anti-friction end bearings between said body and laterally movable saddle.

6. In a lumber truck, the combination with a truck body having a frame, flanged supporting wheels, a central bearing and anti-friction end bearings, of a saddle swiveled upon said frame and resting upon said central and anti-friction end bearings.

7. In a lumber truck, the combination with a truck body, comprising side plates, cross connections between said plates, and flanged supporting wheels, of a saddle resting upon said cross connections, and a swiveled connection between said saddle and truck body.

8. In a lumber truck, the combination with a truck body, comprising side plates, cross connections between said plates, and flanged supporting wheels, of a saddle resting upon said cross connections, a swiveled connection between said saddle and truck body and a stop for limiting movement between the truck body and saddle.

9. In a lumber truck, the combination with a truck body comprising a frame, flanged supporting wheels, a center bearing block and end bearing blocks, of a channel bar supported by said center and end bearing blocks, and a bolt connecting said channel bar with the center bearing block.

WILLIAM W. GREEN.

Witnesses:
A. J. BROWN,
J. H. COOMBS.